(12) United States Patent
Kamiya

(10) Patent No.: US 10,698,381 B2
(45) Date of Patent: Jun. 30, 2020

(54) NUMERICAL CONTROL DEVICE AND NUMERICAL CONTROL METHOD

(71) Applicant: FANUC CORPORATION, Yamanashi (JP)

(72) Inventor: Yohei Kamiya, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 61 days.

(21) Appl. No.: 16/045,948

(22) Filed: Jul. 26, 2018

(65) Prior Publication Data
US 2019/0033821 A1 Jan. 31, 2019

(30) Foreign Application Priority Data
Jul. 27, 2017 (JP) ................................ 2017-145084

(51) Int. Cl.
G05B 19/40 (2006.01)
G05B 19/404 (2006.01)

(52) U.S. Cl.
CPC .. G05B 19/404 (2013.01); *G05B 2219/37634* (2013.01); *G05B 2219/41115* (2013.01); *G05B 2219/41116* (2013.01)

(58) Field of Classification Search
None
See application file for complete search history.

(56) References Cited

U.S. PATENT DOCUMENTS

| 5,170,358 A | 12/1992 | Delio | |
|---|---|---|---|
| 9,690,281 B2 * | 6/2017 | Kataoka | ................. G05B 19/18 |
| 2004/0105184 A1* | 6/2004 | Harada | .............. G11B 5/59633 |
| | | | 360/51 |
| 2010/0104388 A1* | 4/2010 | Suzuki | ............... B23Q 11/0039 |
| | | | 409/131 |

(Continued)

FOREIGN PATENT DOCUMENTS

CN 102029546 A 4/2011
CN 202028972 U 11/2011
(Continued)

OTHER PUBLICATIONS

English Abstract and Machine Translation for Japanese Publication No. 2010-247316 A, published Nov. 4, 2010, 11 pgs.
(Continued)

*Primary Examiner* — Jason Lin
(74) *Attorney, Agent, or Firm* — Fredrikson & Byron, P.A.

(57) ABSTRACT

A numerical control method at least controls a spindle motor of a machine tool so as to perform machining in accordance with machining conditions. In the method, vibration occurring in a tool is acquired with a vibration acquisition unit, and the machining on a workpiece performed by a machining control unit is stopped when vibration having a predetermined amplitude or greater occurs in the tool. Based on state data indicating the state of the spindle motor at that time, multiple compensation plans for compensating the state of the spindle motor in order to suppress vibration
(Continued)

occurring in the tool are calculated. The thus calculated multiple compensation plans are displayed on a display unit together with the state of the spindle motor at the time of occurrence of vibration having the predetermined amplitude or greater in the tool.

17 Claims, 7 Drawing Sheets

(56) References Cited

U.S. PATENT DOCUMENTS

| | | | | |
|---|---|---|---|---|
| 2013/0345851 | A1* | 12/2013 | Kataoka | G05B 19/18 700/174 |
| 2016/0346891 | A1* | 12/2016 | Ando | G05B 19/404 |

FOREIGN PATENT DOCUMENTS

| | | |
|---|---|---|
| CN | 102452022 A | 5/2012 |
| JP | 61172751 U | 10/1986 |
| JP | 2002283186 A | 10/2002 |
| JP | 2010247316 A | 11/2010 |
| JP | 2012213830 A | 11/2012 |
| JP | 2013215809 A | 10/2013 |
| JP | 2015217500 A | 12/2015 |
| JP | 201787338 A | 5/2017 |

OTHER PUBLICATIONS

English Abstract and Machine Translation for Japanese Publication No. 2013-215809 A, published Oct. 24, 2013, 21 pgs.

English Machine Translation for Japanese Publication No. JPS61-172751 U, published Oct. 27, 1986, 4 pgs.

English Abstract and Machine Translation for Japanese Publication No. 2017-087338 A, published May 25, 2017, 14 pgs.

English Abstract for Japanese Publication No. 2012-213830 A, published Nov. 8, 2012, 1 pg.

Untranslated Decision to Grant a Patent mailed by Japan Patent Office (JPO) for Application No. 2017-145084, dated Jun. 18, 2019, 3 pgs.

English Machine Translation of Decision to Grant a Patent mailed by Japan Patent Office (JPO) for Application No. 2017-145084, dated Jun. 18, 2019, 2 pgs.

Untranslated Notice of Reasons for Refusal mailed by Japan Patent Office (JPO) for Application No. 2017-145084, dated Feb. 26, 2019, 4 pgs.

English Machine Translation of Notice of Reasons for Refusal mailed by Japan Patent Office (JPO) for Application No. 2017-145084, dated Feb. 26, 2019, 4 pgs.

English Abstract and Machine Translation for Japanese Publication No. 2015-217500 A, published Dec. 7, 2015, 28 pgs.

English Abstract and Machine Translation for Chinese Publication No. 202028972 U, published Nov. 9, 2011, 30 pgs.

English Abstract and Machine Translation for Chinese Publication No. 102029546 A, published Apr. 27, 2011, 16 pgs.

English Abstract and Machine Translation for Chinese Publication No. 102452022 A, published May 16, 2012, 14 pgs.

English Abstract and Machine Translation for Japanese Publication No. 2002-283186 A, published Oct. 3, 2002, 9 pgs.

\* cited by examiner

NUMERICAL CONTROL DEVICE AND NUMERICAL CONTROL METHOD

CROSS-REFERENCE TO RELATED APPLICATION

This application is based upon and claims the benefit of priority from Japanese Patent Application No. 2017-145084 filed on Jul. 27, 2017, the contents of which are incorporated herein by reference.

BACKGROUND OF THE INVENTION

Field of the Invention

The present invention relates to a numerical control device and a numerical control method for controlling a machine tool.

Description of the Related Art

Japanese Laid-Open Patent Publication No. 2012-213830 discloses a machining control device for a machine tool that suppresses chatter vibration. In brief explanation, when chatter vibration occurs, the chatter vibration is suppressed by changing the rotational speed of a spindle.

SUMMARY OF THE INVENTION

However, in Japanese Laid-Open Patent Publication No. 2012-213830, the spindle rotational speed is changed in order to suppress chatter vibration. However, the amount of cut (cutting depth into a workpiece) is not considered. Therefore, although chatter vibration can be avoided, machining efficiency may decrease, the loss of the spindle motor may increase, and/or the amount of heat generation may increase. Further, it is difficult to find machining conditions for suppressing chatter vibration in consideration of machining efficiency, spindle motor loss, the amount of heat generation and the like.

It is therefore an object of the present invention to provide a numerical control device and a numerical control method that assist an operator in changing the machining conditions for suppressing chatter vibration, in consideration of machining efficiency, spindle motor loss, the amount of heat generation and the like.

According to the first aspect of the present invention, a numerical control device for controlling a machine tool configured to machine a workpiece with a tool attached to a spindle by moving the tool and the workpiece relatively to each other, in accordance with machining conditions, includes: a machining control unit configured to at least control a spindle motor of the machine tool so as to perform machining in accordance with the machining conditions; a vibration acquisition unit configured to acquire vibration occurring in the tool; a machining stopping unit configured to stop the machining on the workpiece performed by the machining control unit when vibration of a predetermined amplitude or greater occurs in the tool; a state acquisition unit configured to acquire state data indicating the state of the spindle motor configured to rotate the spindle; a compensation plan calculating unit configured to calculate, based on the state data, multiple compensation plans for compensating the state of the spindle motor in order to suppress vibration occurring in the tool when vibration of the predetermined amplitude or greater occurs in the tool; and a display control unit configured to cause a display unit to display the state of the spindle motor at the time of occurrence of vibration having the predetermined amplitude or greater in the tool, together with the calculated multiple compensation plans, when vibration of the predetermined amplitude or greater has occurred in the tool.

According to the second aspect of the present invention, a numerical control method for controlling a machine tool configured to machine a workpiece with a tool attached to a spindle by moving the tool and the workpiece relatively to each other, in accordance with machining conditions, includes: a machining control step of at least controlling a spindle motor of the machine tool so as to perform machining in accordance with the machining conditions; a vibration acquisition step of acquiring vibration occurring in the tool; a machining stopping step of stopping the machining on the workpiece performed in the machining control step when vibration of a predetermined amplitude or greater occurs in the tool; a state acquisition step of acquiring state data indicating the state of the spindle motor configured to rotate the spindle; a compensation plan calculating step of calculating, based on the state data, multiple compensation plans for compensating the state of the spindle motor in order to suppress vibration occurring in the tool when vibration of the predetermined amplitude or greater occurs in the tool; and a display control step of causing a display unit to display the state of the spindle motor at the time of occurrence of vibration having the predetermined amplitude or greater in the tool, together with the calculated multiple compensation plans, when vibration of the predetermined amplitude or greater has occurred in the tool.

According to the present invention, it is possible to easily assist the operator in changing the machining conditions in order to suppress chatter vibration, while taking into consideration machining efficiency, the loss of the spindle motor, the amount of heat generation and the like. Therefore, the operator can select, from among the plurality of displayed compensation plans, appropriate machining conditions for suppressing chatter vibration taking into consideration machining efficiency, the loss of the spindle motor, the amount of heat generation, etc.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The numerical control device and numerical control method according to the present invention will be detailed hereinbelow by describing preferred embodiments with reference to the accompanying drawings.

First Embodiment

Figure 1:
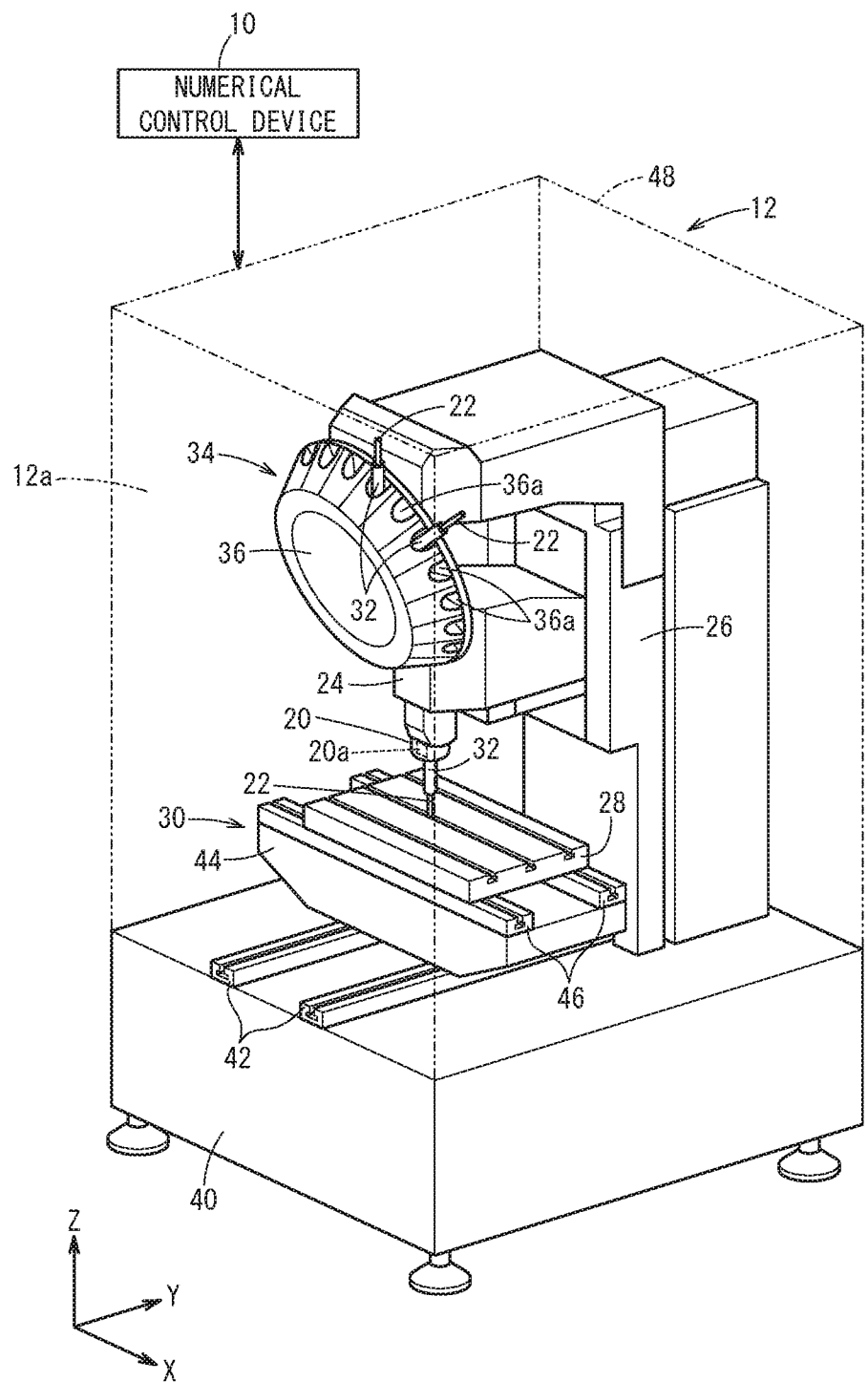
FIG. 1 is a schematic configuration diagram of a machine tool to be controlled by a numerical control device according to an embodiment of the present invention.

FIG. 1 is a schematic configuration diagram of a machine tool 12 to be controlled by a numerical control device 10 of the present embodiment. A machine tool 12 machines an unillustrated object to be processed (workpiece) with a tool 22 attached to a spindle 20. The machine tool 12 includes the spindle 20, a spindle head 24 for rotationally driving the spindle 20 about the Z-axis parallel to the Z-direction (vertical direction), a column 26 for moving the spindle head 24 in the Z-direction, a table 28 arranged on the lower (negative Z-direction) side of the spindle 20 and configured to support the workpiece, and a table driving unit 30 for moving the table 28 in the X-direction and the Y-direction. It is assumed that the X-direction, the Y-direction and the Z-direction are ideally orthogonal to each other.

While being rotated, the spindle 20 is moved in the Z-direction and the table 28 is moved in the X-direction and the Y-direction, whereby the machine tool 12 is capable of drilling the workpiece at a desired position and machining the workpiece three-dimensionally. Here, it is assumed that the force of gravity acts in the negative Z-direction. In addition, since chatter vibration may occur in the tool 22 during machining, a vibration sensor 20a is provided on the spindle 20 in order to detect such chatter vibration. The vibration sensor 20a may be an acceleration sensor such as a gyro sensor.

The tool 22 is held by a tool holder 32. The tool holder 32 is configured to be attached to and removed from the spindle 20. The tool 22 is attached to the spindle 20 via the tool holder 32. By inserting the tool holder 32 into an attachment hole (not shown) formed at the tip of the spindle 20, the tool 22 is attached to the spindle 20. The tool 22 rotates together with the spindle 20 about a Z-axis parallel to the Z-direction.

The machine tool 12 is configured as a machining center in which the tool 22 attached to the spindle 20 can be changed by an automatic tool changer 34. The automatic tool changer 34 has a turret (revolving-type) tool magazine 36. The tool magazine 36 has a plurality of grips 36a arranged along the circumferential direction. Each of the multiple grips 36a removably holds a tool 22 via the tool holder 32. The tool holder 32 is attachable to and removable from the grip 36a, and the tool 22 is attached to the grip 36a via the tool holder 32. Examples of the tool 22 include spring-necked tools or non-turning tools, drills, end mills, milling cutters and the like.

A Z-axis driving mechanism for moving the spindle head 24 relative to the column 26 in the Z-axis direction parallel to the Z-direction is coupled to the spindle head 24. Though not shown, the Z-axis driving mechanism includes a Z-axis motor (servomotor) and a power transmission mechanism (ball screw, nut, etc.) for converting rotational motion of the Z-axis motor into rectilinear motion and transmitting it to the spindle head 24. Further, the spindle 20 rotates about the Z-axis parallel to the Z-direction by driving a spindle motor M1 (see FIG. 2) composed of a servomotor provided in the spindle head 24. Further, the tool magazine 36 rotates (turns) by an unillustrated turning motor. The drives of the Z-axis motor, the spindle motor M1 and the turning motor are controlled by the numerical control device 10.

The column 26 and the table driving unit 30 are supported on a base 40. The table driving unit 30 has Y-axis sliders 42, a saddle 44 and X-axis sliders 46. The saddle 44 is supported so as to be movable in the Y-direction relative to the base 40 via the Y-axis sliders 42. The table 28 is supported so as to be movable in the X-direction relative to the saddle 44 via the X-axis sliders 46.

An unillustrated Y-axis driving mechanism for moving the saddle 44 relative the base 40 in the Y-axis direction parallel to the Y-direction is coupled to the saddle 44. Similarly, an unillustrated X-axis driving mechanism for moving the table 28 relative to the saddle 44 in the X-axis direction parallel to the X-direction is coupled to the table 28. The Y-axis driving mechanism includes a Y-axis motor M2 (see FIG. 2) composed of a servomotor, and an unillustrated power transmission mechanism (ball screw, nut, etc.) for converting rotational motion of the Y-axis motor M2 into rectilinear motion and transmitting it to the saddle 44. The X-axis driving mechanism includes an X-axis motor M3 (see FIG. 2) composed of a servomotor, and an unillustrated power transmission mechanism (ball screw, nut, etc.) for converting rotational motion of the X-axis motor M3 into rectilinear motion and transmitting it to the table 28. The drives of the Y-axis motor M2 and the X-axis motor M3 are controlled by the numerical control device 10.

By driving the Y-axis motor M2 and the X-axis motor M3, it is possible to move the axis of the tool 22 attached to the spindle 20 along the XY plane with respect to the workpiece set on the table 28. The moving speed (feed rate) of the tool 22 along the XY plane can be varied by changing the rotational speeds of the Y-axis motor M2 and the X-axis motor M3.

The machine tool 12 is provided with a splash guard 48 for covering a machining area 12a of the machine tool 12 to prevent scraps (machining debris, chips) generated by machining from scattering to the surroundings. The machine tool 12 may be provided with nozzles (not shown) for ejecting a cutting fluid toward the tool 22 while machining.

Figure 2:
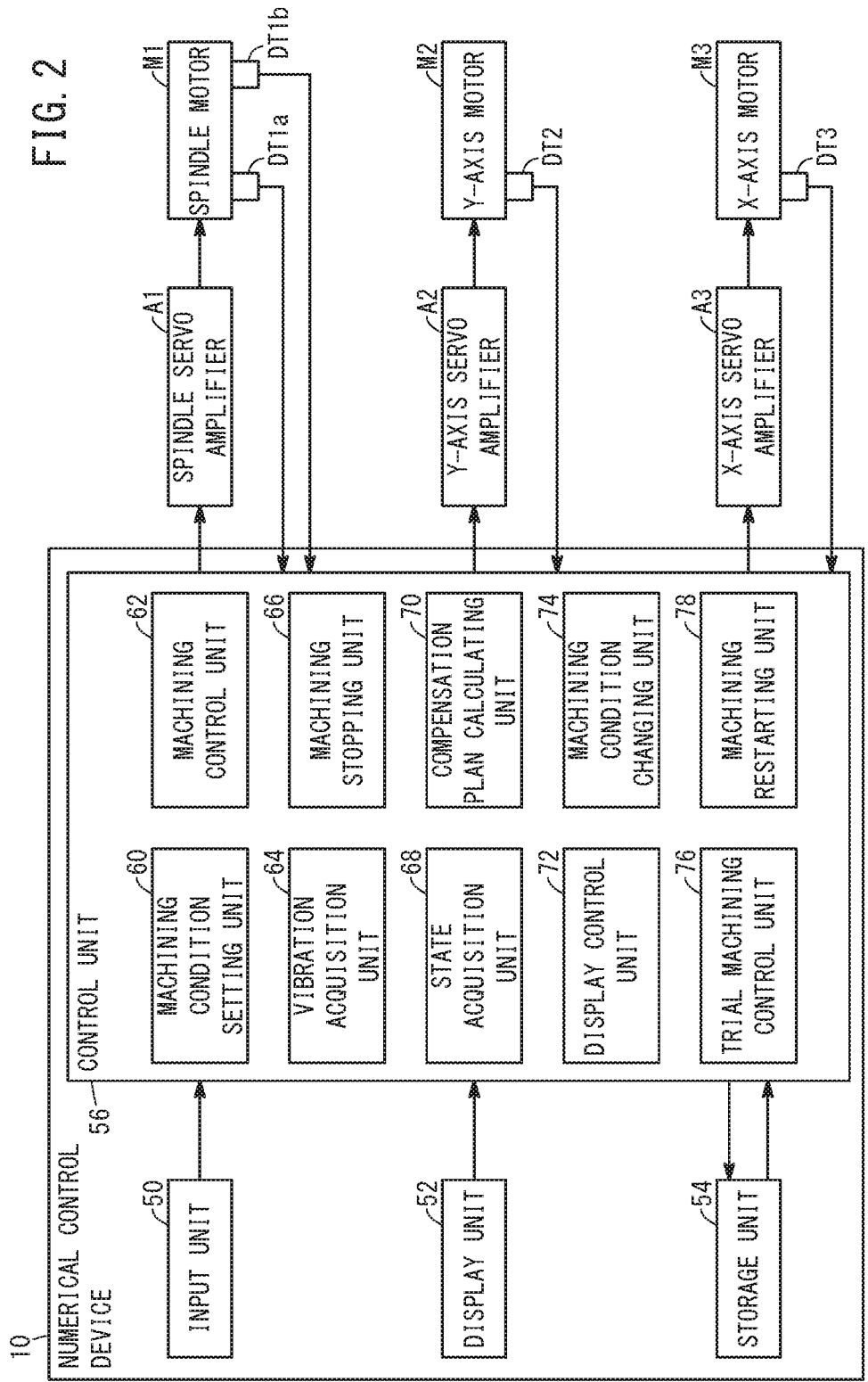
FIG. 2 is a functional block diagram showing the configuration of the numerical control device shown in FIG. 1.

FIG. 2 is a functional block diagram showing a configuration of the numerical control device 10. The numerical control device 10 includes an input unit 50, a display unit 52, a storage unit 54 and a control unit 56.

The input unit 50 is an operation unit for receiving operator's instructions, and made up of, for example, a keyboard, a mouse, a touch panel and the like.

The display unit 52 displays images and the like, and comprises a liquid crystal display, an organic EL display, or the like. Note that a touch panel serving as the input unit 50 may be provided on the display screen of the display unit 52.

The storage unit 54 includes a storage medium such as a volatile memory, a nonvolatile memory, a hard disk, or the like. The storage unit 54 stores data (for example, machining program, machining conditions and the like) necessary for the control unit 56 to control.

The control unit 56 includes a processor such as a CPU and controls the spindle motor M1, the Y-axis motor M2, the X-axis motor M3 and others to thereby control machining on a workpiece of the machine tool 12. The control unit 56 controls the spindle motor M1 via a spindle servo amplifier A1. The control unit 56 also controls the Y-axis motor M2 via a Y-axis servo amplifier A2 and the X-axis motor M3 via an X-axis servo amplifier A3.

The spindle motor M1 is provided with a rotational position detector DT1a for detecting the rotational position of the spindle motor M1 (more specifically, the rotational position of the rotor of the spindle motor M1) and a torque detector DT1b for detecting the torque generated in the spindle motor M1. The rotational position detector DT1a may directly detect the rotational position of the spindle motor M1 or may detect information representing the rotational position. The torque detector DT1b may directly detect the torque of the spindle motor M1 or may detect information representing load torque (e.g., electric current flowing through the spindle motor M1, etc.). The rotational position detected by the rotational position detector DT1a is used for feedback control of the spindle motor M1. By detecting the rotational position of the spindle motor M1, the rotational speed of the spindle motor M1 (more specifically, the rotational speed of the rotor of the spindle motor M1) is also known.

The Y-axis motor M2 and the X-axis motor M3 are also provided with rotational position detectors DT2, DT3 for detecting the rotational positions of the Y-axis motor M2 and the X-axis motor M3. The rotational position detectors DT2 and DT3 may directly detect the rotational positions of the Y-axis motor M2 and the X-axis motor M3, or may detect information representing the rotational positions. The rotational positions detected by the rotational position detectors DT2 and DT3 are used for feedback control of the Y-axis motor M2 and the X-axis motor M3. By detecting the rotational positions of the Y-axis motor M2 and the X-axis motor M3, the rotational speeds of the Y-axis motor M2 and the X-axis motor M3 are also known.

The control unit 56 includes a machining condition setting unit 60, a machining control unit 62, a vibration acquisition unit 64, a machining stopping unit 66, a state acquisition unit 68, a compensation plan calculating unit 70, a display control unit 72, a machining condition changing unit 74, a trial machining control unit 76, and a machining restarting unit 78.

The machining condition setting unit 60 sets machining conditions based on a machining program stored in the storage unit 54. Here, the machining condition setting unit 60 may set the machining conditions using the parameters input by the operator operating the input unit 50. The machining conditions to be set include the rotational speed of the tool 22 and the feed rate of the tool 22. The rotational speed of the tool 22 is determined according to the rotational speed of the spindle motor M1, and the feed rate of the tool 22 is determined according to the rotational speeds of the Y-axis motor M2 and the X-axis motor M3. The set machining conditions are stored in the storage unit 54.

The machining control unit 62 controls the machine tool 12 so as to perform machining in accordance with the set machining conditions. Specifically, the machining control unit 62 controls the spindle motor M1, the Y-axis motor M2, the X-axis motor M3, the Z-axis motor, etc.

Based on the detection signal detected by the vibration sensor 20a, the vibration acquisition unit 64 acquires the vibration generated in the spindle 20 (tool 22). The vibration acquisition unit 64 acquires the vibration of the tool 22 by calculating the vibration occurring in the tool 22 based on the detection signal detected by the vibration sensor 20a. When determining that the amplitude of the acquired vibration is equal to or greater than a predetermined amplitude, the vibration acquisition unit 64 determines that the tool 22 is in a chatter vibration state, and gives notice of the occurrence of chattering to the machining stopping unit 66, the compensation plan calculating unit 70 and the display control unit 72.

When a vibration of a predetermined amplitude or greater occurs in the tool 22, or when the tool 22 is placed in a chatter vibration state, the machining stopping unit 66 stops machining by the machining control unit 62. The machining stopping unit 66 outputs a machining stop signal to the machining control unit 62 to thereby stop machining.

The state acquisition unit 68 acquires state data indicative of a state of the spindle motor M1. The state of the spindle motor M1 at least includes the rotational speed of the spindle motor M1 and the torque of the spindle motor M1. Therefore, the state acquisition unit 68 acquires the detection signal detected by the rotational position detector DT1a, and acquires the rotational speed of the spindle motor M1 based on the detection signal. Further, the state acquisition unit 68 acquires the detection signal detected by the torque detector DT1b, and acquires the torque of the spindle motor M1 based on the detection signal. The state acquisition unit 68 outputs the state data indicative of the acquired state (rotational speed, torque, etc.) of the spindle motor M1 to the compensation plan calculating unit 70 and the display control unit 72. As the feed rate of the tool 22 becomes higher, the cutting amount (cutting depth) increases, so that the torque of the spindle motor M1 becomes grater.

The compensation plan calculating unit 70 calculates a plurality of compensation plans for compensating the state of the spindle motor M1 when vibration with a predetermined amplitude or greater occurs in the tool 22, or when the tool 22 is in a chatter vibration state. Each compensation plan shows how the state of the spindle motor M1 should be compensated in order to suppress vibration occurring in the tool 22.

The compensation plan calculating unit 70 calculates a plurality of compensation plans based on the state data of the spindle motor M1 at the time of occurrence of the vibration having a predetermined amplitude or greater in the tool 22. That is, the plural compensation plans are calculated based on the state data representing the state of the spindle motor M1 under the currently set machining conditions. In the present embodiment, the compensation plan calculating unit 70 calculates first, second and third compensation plans. The compensation plan calculating unit 70 outputs the multiple calculated compensation plans to the display control unit 72.

The first compensation plan is a compensation plan in which the output of the spindle motor M1 is kept the same as that of the spindle motor M1 at the time of occurrence of vibration having a predetermined amplitude or greater in the tool 22. This first compensation plan is calculated based on the state data of the spindle motor M1 at the time of occurrence of vibration having a predetermined amplitude or greater in the tool 22. This first compensation plan is classified into compensation plans (1) and (2), which will be described later.

The second compensation plan is a compensation plan in which the loss of the spindle motor M1 is kept the same as that of the spindle motor M1 at the time of occurrence of vibration having a predetermined amplitude or greater in the tool 22. The second compensation plan is calculated based on the state data of the spindle motor M1 at the time of occurrence of vibration having a predetermined amplitude or greater in the tool 22 and based on the loss data (characteristic data) representing the loss characteristic of the spindle motor M1. This loss data is stored in the storage unit 54. This second compensation plan is classified into compensation plans (3) and (4), which will be described later.

The third compensation plan is a compensation plan in which the torque of the spindle motor M1 is kept the same as that of the spindle motor M1 at the time of occurrence of vibration having a predetermined amplitude or greater in the tool 22. This third compensation plan is calculated based on the state data of the spindle motor M1 at the time of occurrence of vibration having a predetermined amplitude or greater in the tool 22. This third compensation plan is classified into compensation plans (5) and (6) which will be described later.

When vibration of a predetermined amplitude or greater arises in the tool 22, or when the tool 22 is in a chatter vibration state, the display control unit 72 displays the state of the spindle motor M1 on the display unit 52, based on the state data of the spindle motor M1 at the time of occurrence of vibration having a predetermined amplitude or greater in the tool 22. Further, the display control unit 72 displays the multiple compensation plans calculated by the compensation plan calculating unit 70.

Figure 3:
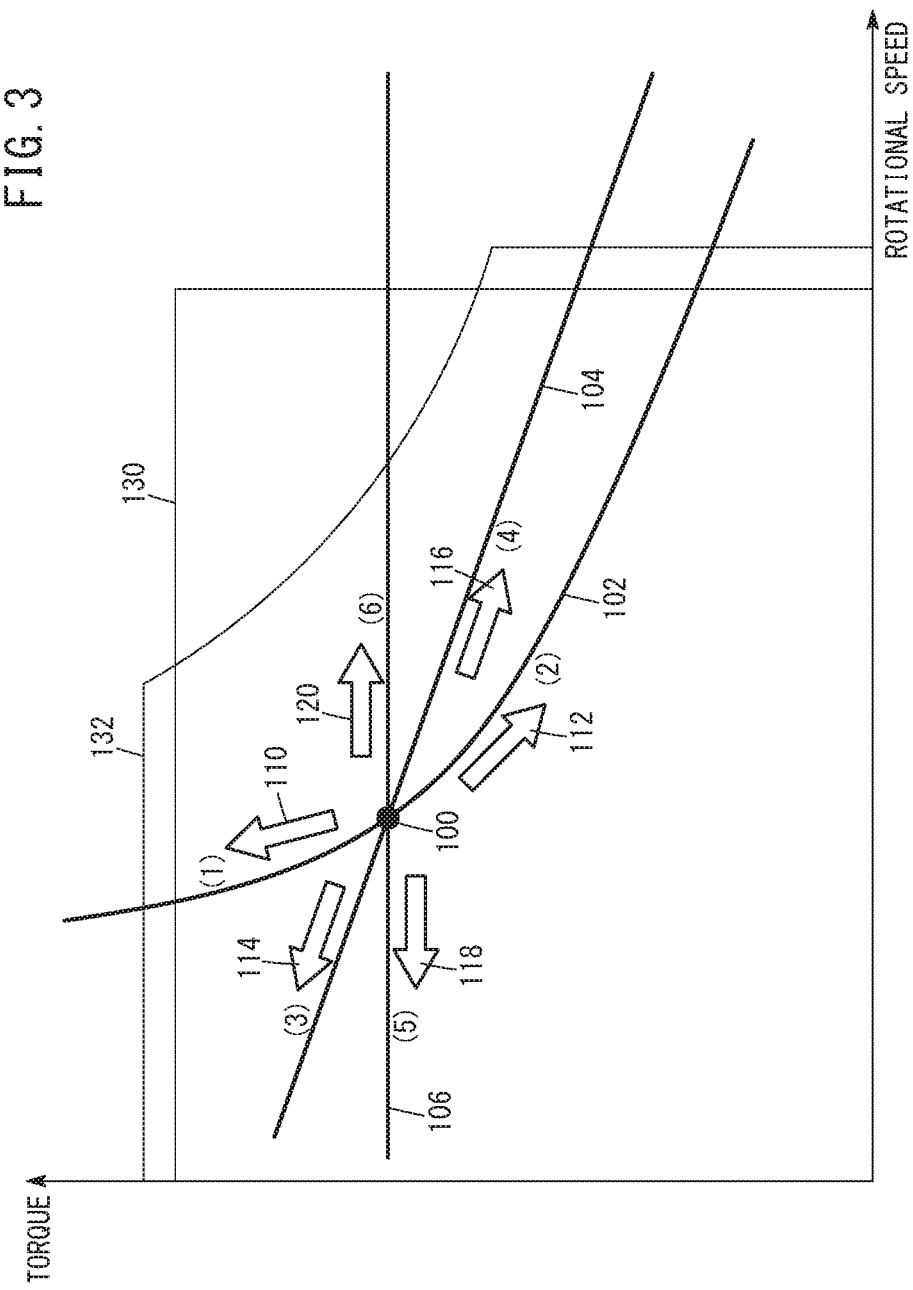
FIG. 3 is a diagram showing, as an example, a state of a spindle motor and a plurality of compensation plans displayed on a display unit when the spindle motor shown in FIG. 2 is an induction motor.
Figure 4:
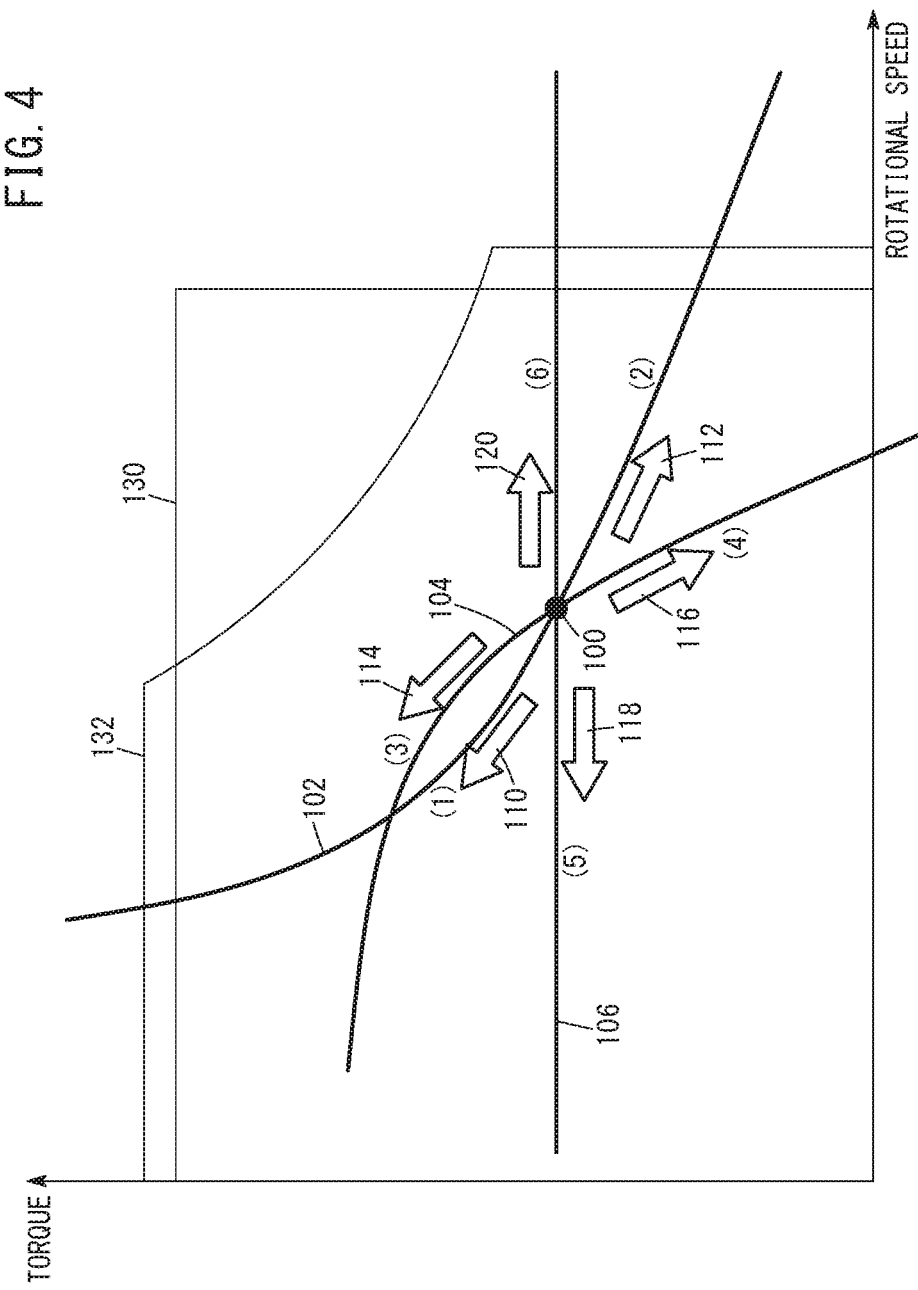
FIG. 4 is a diagram showing, as an example, a state of the spindle motor and a plurality of compensation plans displayed on a display unit when the spindle motor shown in FIG. 2 is a synchronous motor.

FIG. 3 is a diagram showing, as an example, the state of the spindle motor M1 and a plurality of compensation plans displayed on the display unit 52 when the spindle motor M1 is an induction motor, and FIG. 4 is a diagram showing, as an example, the state of the spindle motor M1 and a plurality of compensation plans displayed on the display unit 52 when the spindle motor M1 is a synchronous motor. As shown in FIGS. 3 and 4, the display control unit 72 causes the display unit 52 to display a graph showing the relationship between the rotational speed and the torque, and also display the state (rotational speed, torque, etc.) of the spindle motor M1 and a plurality of compensation plans on the graph. In the examples shown in FIGS. 3 and 4, the horizontal axis represents the rotational speed and the vertical axis represents the torque.

A point 100 represents the state of the spindle motor M1 under the currently set machining conditions. Therefore, the points 100 shown in FIG. 3 and FIG. 4 each show a state of the spindle motor M1 when a vibration of a predetermined amplitude or greater occurs in the tool 22.

A line 102 shows a fixed-power line on which output of the spindle motor M1 is kept the same as output thereof at the time of occurrence of vibration having a predetermined amplitude or greater in the tool 22. The first compensation plan is a compensation plan in which the state of the spindle motor M1 is compensated along this line (which will be referred to as the fixed-power line) 102. In the region where the rotational speed and the torque of the spindle motor M1 are greater than the fixed-power line 102, the output of the spindle motor M1 is higher than that of the spindle motor M1 at the time of occurrence of vibration having a predetermined amplitude or greater in the tool 22. Conversely, in the region where the rotational speed of the spindle motor M1 is smaller than the fixed-power line 102, the output of the spindle motor M1 is smaller than that of the spindle motor M1 at the time of occurrence of vibration having a predetermined amplitude or greater in the tool 22.

A line 104 shows a fixed-loss line on which motor loss of the spindle motor M1 is kept the same as motor loss thereof at the time of occurrence of vibration having a predetermined amplitude or greater in the tool 22. The second compensation plan is a compensation plan in which the state of the spindle motor M1 is compensated along this line (which will be referred to as the fixed-loss line) 104. In the region where the rotational speed and the torque of the spindle motor M1 are greater than the fixed-loss line 104, the loss of the spindle motor M1 is greater than that of the spindle motor M1 at the time of occurrence of vibration having a predetermined amplitude or greater in the tool 22. Conversely, in the region where the rotational speed and the torque of the spindle motor M1 are smaller than the fixed-loss line 104, the loss of the spindle motor M1 is smaller than that of the spindle motor M1 at the time of occurrence of vibration having a predetermined amplitude or greater in the tool 22.

A line 106 shows a fixed-torque line on which torque of the spindle motor M1 is kept the same as torque thereof at the time of occurrence of vibration having a predetermined amplitude or greater in the tool 22. The third compensation plan is a compensation plan in which the state of the spindle motor M1 is compensated along this line (which will be referred to as the fixed-torque line) 106.

As is apparent from the comparison between FIG. 3 and FIG. 4, the behaviors of the fixed-power line 102, the fixed-loss line 104 and the fixed-torque line 106 are different between the case where the spindle motor M1 is an induction motor and the case where the spindle motor M1 is a synchronous motor.

The first compensation plan is classified into compensation plans (1) and (2). The display control unit 72 displays on the display unit 52 an operation button 110 for selecting the compensation plan (1) and an operation button 112 for selecting the compensation plan (2). In the compensation plan (1), the state of the spindle motor M1 is compensated along the fixed-power line 102 in a direction in which the torque increases from the point 100 while the rotational speed is decreased. In the compensation plan (2), the state of the spindle motor M1 is compensated along the fixed-power line 102 in a direction in which the torque decreases from point 100 while the rotational speed is increased.

The second compensation plan is classified into compensation plans (3) and (4). The display control unit 72 displays on the display unit 52 an operation button 114 for selecting the compensation plan (3) and an operation button 116 for selecting the compensation plan (4). In the compensation plan (3), the state of the spindle motor M1 is compensated along the fixed-loss line 104 in a direction in which the torque increases from the point 100 while the rotational speed is decreased. In the compensation plan (4), the state of the spindle motor M1 is compensated along the fixed-loss line 104 in a direction in which the torque decreases from the point 100 while the rotational speed is increased.

The third compensation plan is classified into compensation plans (5) and (6). The display control unit 72 displays on the display unit 52 an operation button 118 for selecting the compensation plan (5) and an operation button 120 for selecting the compensation plan (6). In the compensation plan (5), the state of the spindle motor M1 is compensated along the fixed-torque line 106 from the point 100 in a direction in which the rotational speed decreases. In the compensation plan (6), the state of the spindle motor M1 is compensated along the fixed-torque line 106 from the point 100 in a direction in which the rotational speed increases.

By selecting one of the operation buttons 110, 112, 114, 116, 118 and 120 displayed on the screen of the display unit 52, the operator can select one of the compensation plans (1) to (6). The operation and effect obtained by the compensation according to the compensation plans (1) to (6) will be detailed later.

Here, the display control unit 72 may be configured to display a usable range (represented by the rotational speed and the torque) 130 of the tool 22, and a output permissible range (represented by the rotational speed and the torque)

132 within which the spindle motor M1 can produce output, together with the compensation plans etc. The usable range 130 of the tool 22, and the characteristic data representing the output characteristics of the spindle motor M1 are stored in the storage unit 54. With the output characteristics of the spindle motor M1, the output permissible range 132 within which the spindle motor M1 can produce output can also be grasped. As a result, the operator can easily recognize to what extent the state of the spindle motor M1 can be compensated. In addition, when chatter vibration occurs, the display control unit 72 may cause the display unit 52 to display information indicating the occurrence of chatter vibration.

In this way, since the multiple compensation plans are calculated and displayed, it is possible to easily assist the operator in changing the machining conditions for suppressing chatter vibration, taking into consideration machining efficiency, the loss of the spindle motor M1, heat generation, etc. Thus, the operator can select appropriate machining conditions for suppressing chatter vibration from the displayed multiple compensation plans, while taking into consideration machining efficiency, the loss of the spindle motor M1, heat generation, etc.

The machining condition changing unit 74 changes the machining conditions (the rotational speed of the tool 22 and the feed rate of the tool 22) so that the state of the spindle motor M1 is compensated in accordance with the compensation plan selected by the operator, within the usable range 130 of the tool 22 and within the output permissible range 132 within which the spindle motor M1 can produce output. The rotational speed of the tool 22, which is one of the machining conditions, changes, and the rotational speed of the spindle motor M1 accordingly changes. The feed rate of the tool 22, which is another one of the machining conditions, changes, and the rotational speeds of the Y-axis motor M2 and the X-axis motor M3 accordingly change. The machining condition changing unit 74 revises the machining conditions set by the machining condition setting unit 60. The changed machining conditions are stored in the storage unit 54.

Specifically, when a compensation plan is selected by the operator, the machining condition changing unit 74 changes the machining conditions (the rotational speed of the tool 22 and the feed rate of the tool 22) so as to shift the state of the spindle motor M1 by a given amount along the selected compensation plan. For example, when the operator selects the compensation plan (1), the machining condition changing unit 74 changes the machining conditions so as to shift the state of the spindle motor M1, i.e., the position of the point 100, by a given amount along the fixed-power line 102 in a direction to decrease the rotational speed.

Here, if the resultant state of the spindle motor M1 after shifting the state by a given amount in accordance with the selected compensation plan falls outside the usable range 130 of the tool 22 or the output permissible range 132 of the spindle motor M1, the machining condition changing unit 74 changes the machining conditions with an amount of shift limited.

At this time, when a compensation plan is selected by the operator, the display control unit 72 moves the currently displayed state of the spindle motor M1 along the selected compensation plan. That is, the display control unit 72 moves the position of the displayed point 100 along the selected compensation plan. The position of the state of the spindle motor M1 after the movement represents the state of the spindle motor M1 based on the machining conditions changed by the machining condition changing unit 74.

Figure 5:
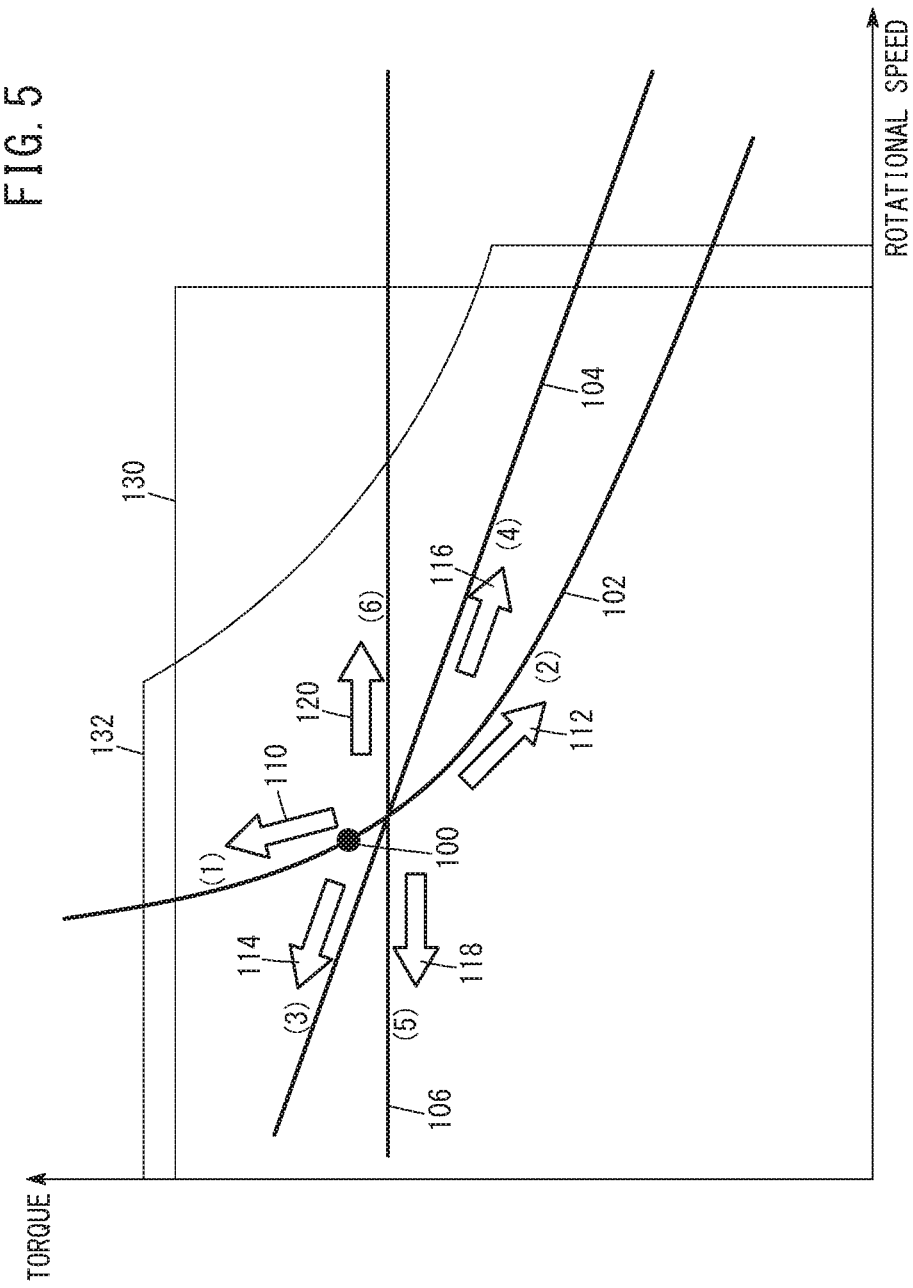
FIG. 5 is a diagram showing a state of the spindle motor based on machining conditions after a change thereof in the case where a compensation plan (1) is selected by an operator in FIG. 3.
Figure 6:
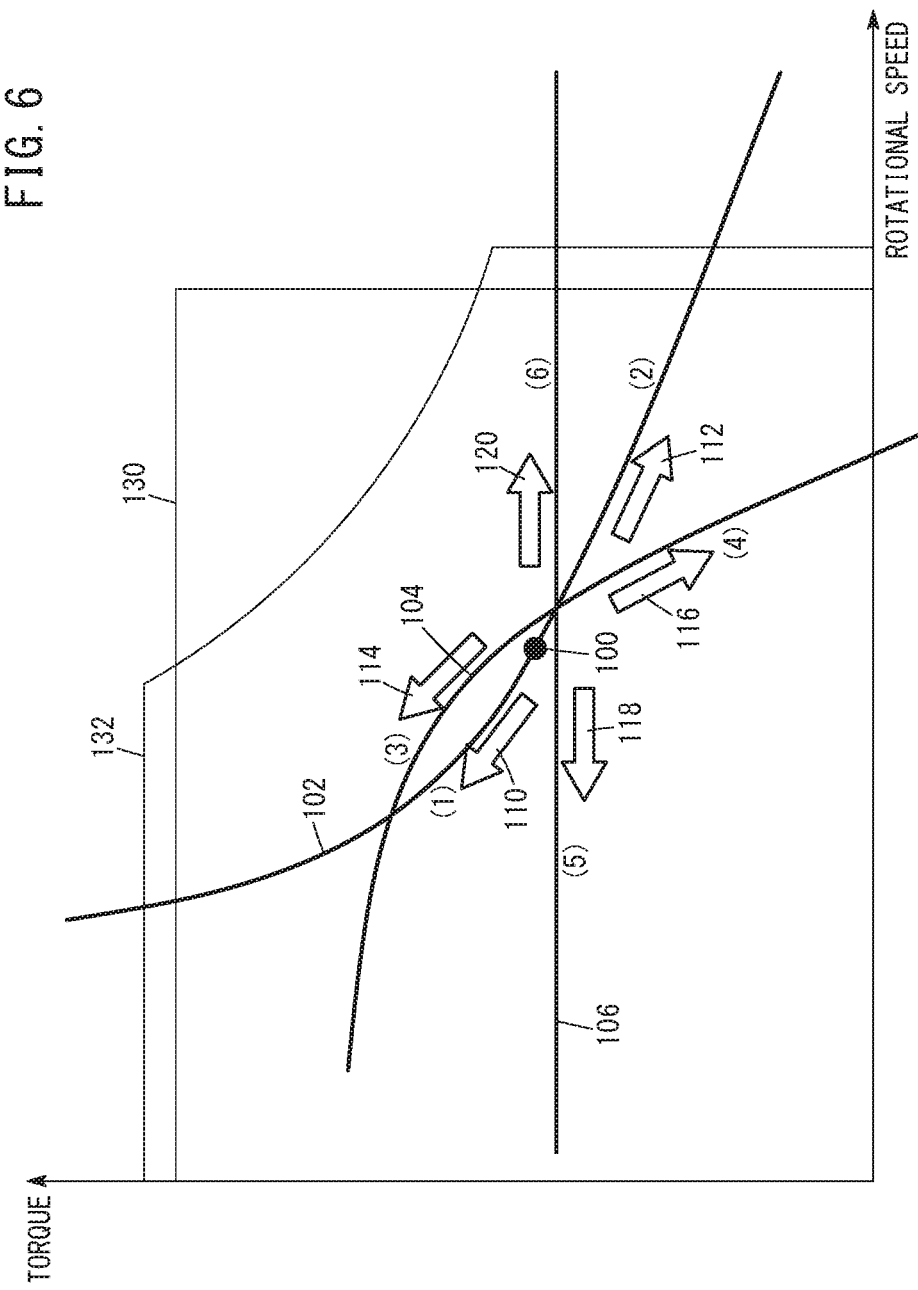
FIG. 6 is a diagram showing a state of the spindle motor based on machining conditions after a change thereof in the case where a compensation plan (1) is selected by the operator in FIG. 4.

Specifically, the display control unit 72 moves the displayed state of the spindle motor M1 by a given amount along the selected compensation plan. For example, when the compensation plan (1) is selected by the operator, the display control unit 72 moves the position of the displayed point 100 along the fixed-power line 102 by a given amount in a direction to decrease the rotational speed, as shown in FIGS. 5 and 6. As a result, it is possible for the operator to visually recognize the state of the spindle motor M1 operated in the changed machining conditions.

Here, if the state of the spindle motor M1 as a result of shifting by a given amount in accordance with the selected compensation plan, falls outside the usable range 130 of the tool 22 or the output permissible range 132 of the spindle motor M1, the display control unit 72 limits the amount of shift.

Such a given amount may be a predetermined shift amount or may be a variable shift amount that changes depending on the time period during which the operator presses the operation button for selecting the compensation plan. Alternatively, the given amount may be a variable shift amount that changes depending on the number of times the operator presses the operation button for selecting the compensation plan.

The trial machining control unit 76, based on the machining conditions changed by the machining condition changing unit 74, performs trial machining on the workpiece. That is, the trial machining control unit 76 controls the machine tool 12 so as to perform machining in accordance with the changed machining conditions. More specifically, the trial machining control unit 76 controls the spindle motor M1, the Y-axis motor M2, the X-axis motor M3, the Z-axis motor, etc.

The machining restarting unit 78 causes the machining control unit 62 to restart machining on the workpiece with the machining conditions changed by the machining condition changing unit 74. The machining restarting unit 78 outputs a machining restarting signal to the machining control unit 62 to thereby restart machining. When vibration of a predetermined amplitude or greater does not occur in the tool 22 at the time of trial machining implemented by the trial machining control unit 76 or when the operator gives instructions, the machining restarting unit 78 causes the machining control unit 62 to restart machining of the workpiece with the machining conditions changed by the machining condition changing unit 74. The machining restarting unit 78 outputs the machining restarting signal to the machining control unit 62 to thereby restart machining. The operator can give instructions in order to perform machining with the changed machining conditions, by operating the input unit 50. Thus, it is possible to restart the machining with the machining conditions that do not cause chatter vibration or with the machining conditions that satisfy the operator.

Next, when the spindle motor M1 is an induction motor, the operation and effect will be described in the case where the machining conditions are changed in accordance with the compensation plans (1) to (6) shown in FIG. 3.

When the compensation plan (1) is selected by the operator, the machining conditions are changed so as to decrease the rotational speed of the spindle motor M1 and increase the torque of the spindle motor M1 along the fixed-power line 102. In order to increase the torque of the spindle motor M1, it is necessary to increase the feed rate of the tool 22, and accordingly the cutting amount (cutting depth into the workpiece) increases. As a result, the vibration occurring in the tool 22 is suppressed without lowering machining efficiency. In the compensation plan (1), the amount of heat generation increases, but the life of the tool 22 remains substantially unchanged, as compared to the case of the machining conditions before change.

When the compensation plan (2) is selected by the operator, the machining conditions are changed so as to increase the rotational speed of the spindle motor M1 and decrease the torque of the spindle motor M1 along the fixed-power line 102. In order to lower the torque of the spindle motor M1, it is necessary to decrease the feed rate of the tool 22, and accordingly the cutting amount decreases. As a result, the vibration occurring in the tool 22 is suppressed without changing machining efficiency. In the compensation plan (2), the amount of heat generation decreases and the life of the tool 22 remains substantially unchanged, as compared to the case of the machining conditions before change.

When the compensation plan (3) is selected by the operator, the machining conditions are changed so as to decrease the rotational speed of the spindle motor M1 and increase the torque of the spindle motor M1 along the fixed-loss line 104. In order to increase the torque of the spindle motor M1, it is necessary to increase the feed rate of the tool 22. Accordingly, the cutting amount (cutting depth into the workpiece) increases, but increase in cutting amount is smaller than that in the compensation plan (1). Thus, the vibration occurring in the tool 22 is suppressed while suppressing reduction in machining efficiency. In the compensation plan (3), the amount of heat generation does not increase while the life of the tool 22 is prolonged, as compared to the machining conditions before change.

When the compensation plan (4) is selected by the operator, the machining conditions are changed so as to increase the rotational speed of the spindle motor M1 and decrease the torque of the spindle motor M1 along the fixed-loss line 104. In order to lower the torque of the spindle motor M1, it is necessary to decrease the feed rate of the tool 22. Accordingly, the cutting amount decreases, however the decrease in cutting amount is smaller than that in the compensation plan (2). As a result, machining efficiency increases and the vibration arising in the tool 22 is suppressed. In the compensation plan (4), though the amount of heat generation does not increase, the life of the tool 22 is shortened, as compared to the case of the machining conditions before change.

When the compensation plan (5) is selected by the operator, the machining conditions are changed so as to decrease the rotational speed of the spindle motor M1 along the fixed-torque line 106. As a result, though machining efficiency decreases, the vibration arising in the tool 22 is suppressed. In the compensation plan (5), the amount of heat generation decreases, and the life of the tool 22 is prolonged, as compared to the case of the machining conditions before change.

When the compensation plan (6) is selected by the operator, the machining conditions are changed so as to increase the rotational speed of the spindle motor M1 along the fixed-torque line 106. As a result, machining efficiency increases, and the vibration arising in the tool 22 is suppressed. In the compensation plan (6), the amount of heat generation increases, and the life of the tool 22 becomes shorter, as compared to the case of the machining conditions before change.

Next, when the spindle motor M1 is a synchronous motor, the operation and effect will be described in the case where the machining conditions are changed in accordance with the compensation plans (1) to (6) shown in FIG. 4.

When the compensation plan (1) is selected by the operator, the machining conditions are changed so as to decrease the rotational speed of the spindle motor M1 and increase the torque of the spindle motor M1 along the fixed-power line 102. In order to increase the torque of the spindle motor M1, it is necessary to increase the feed rate of the tool 22, and accordingly the cutting amount (cutting depth into the workpiece) increases. As a result, the vibration occurring in the tool 22 is suppressed without lowering machining efficiency. In the compensation plan (1), the amount of heat generation decreases and the life of the tool 22 remains substantially unchanged, as compared to the case of the machining conditions before change.

When the compensation plan (2) is selected by the operator, the machining conditions are changed so as to increase the rotational speed of the spindle motor M1 and decrease the torque of the spindle motor M1 along the fixed-power line 102. In order to lower the torque of the spindle motor M1, it is necessary to decrease the feed rate of the tool 22, and accordingly the cutting amount decreases. As a result, the vibration occurring in the tool 22 is suppressed without changing machining efficiency. In the compensation plan (2), the amount of heat generation increases but the life of the tool 22 remains substantially unchanged, as compared to the case of the machining conditions before change.

When the compensation plan (3) is selected by the operator, the machining conditions are changed so as to decrease the rotational speed of the spindle motor M1 and increase the torque of the spindle motor M1 along the fixed-loss line 104. In order to increase the torque of the spindle motor M1, it is necessary to increase the feed rate of the tool 22. Accordingly, the cutting amount (cutting depth into the workpiece) increases. This increase in cutting amount is greater than that in the compensation plan (1). As a result, machining efficiency increases, and the vibration arising in the tool 22 is suppressed. In the compensation plan (3), the amount of heat generation does not increase but the life of the tool 22 is shortened, as compared to the case of the machining conditions before change.

When the compensation plan (4) is selected by the operator, the machining conditions are changed so as to increase the rotational speed of the spindle motor M1 and decrease the torque of the spindle motor M1 along the fixed-loss line 104. In order to lower the torque of the spindle motor M1, it is necessary to decrease the feed rate of the tool 22. Accordingly, the cutting amount decreases, however the reduction in cutting amount is greater, as compared to the case in the compensation plan (2). As a result, though machining efficiency decreases, the vibration arising in the tool 22 is suppressed. In the compensation plan (4), the amount of heat generation does not change and the life of the tool 22 becomes longer, as compared to the case of the machining conditions before change.

When the compensation plan (5) is selected by the operator, the machining conditions are changed so as to decrease the rotational speed of the spindle motor M1 along the fixed-torque line 106. As a result, though machining efficiency decreases, the vibration occurring in the tool 22 is suppressed. In the compensation plan (5), the amount of heat generation decreases, and the life of the tool 22 is prolonged, as compared to the case of the machining conditions before change.

When the compensation plan (6) is selected by the operator, the machining conditions are changed so as to increase the rotational speed of the spindle motor M1 along the fixed-torque line 106. As a result, machining efficiency increases, and the vibration arising in the tool 22 is suppressed. In the compensation plan (6), the amount of heat generation increases, and the life of the tool 22 becomes shorter, as compared to the case of the machining conditions before change.

Figure 7:
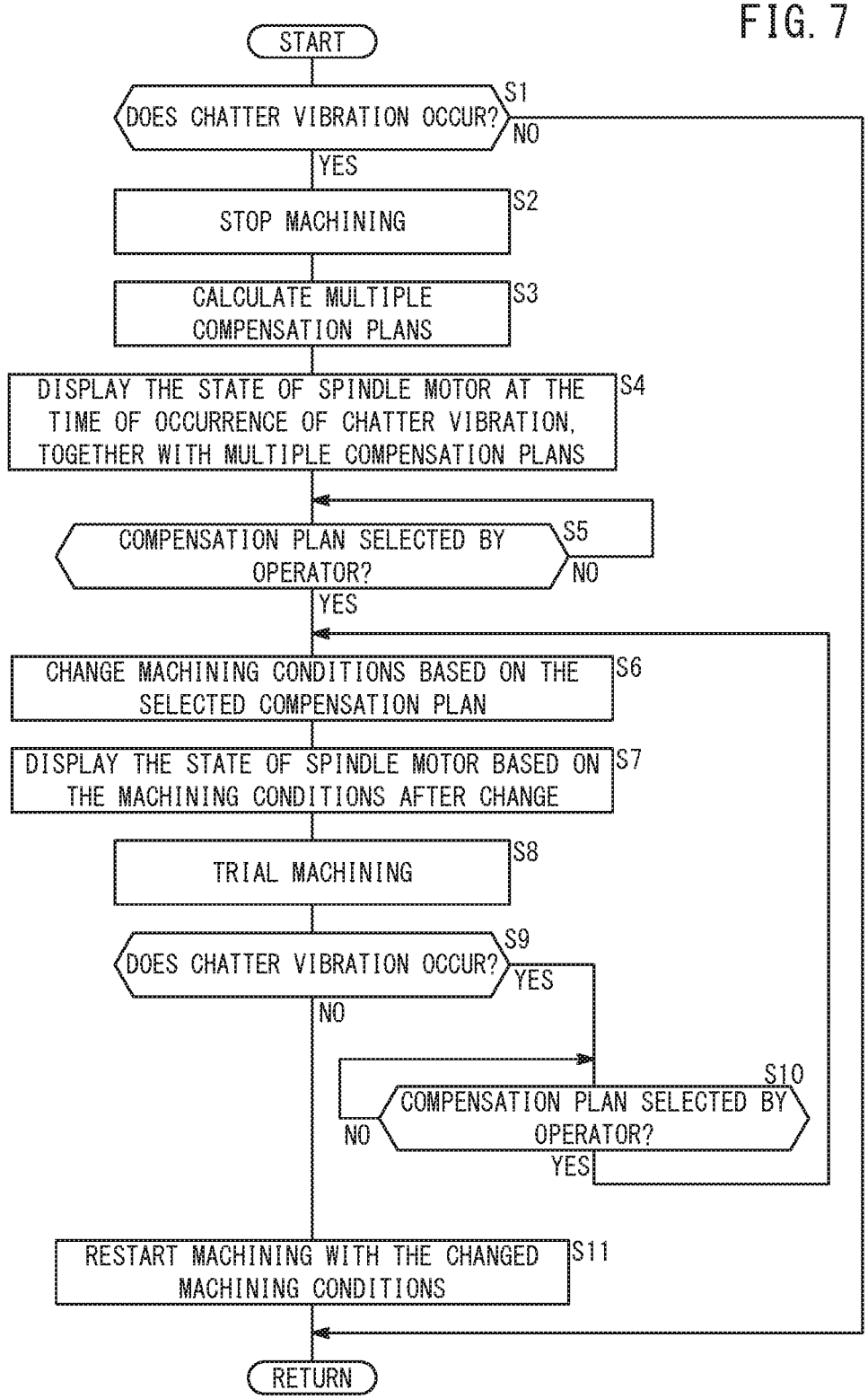
FIG. 7 is a flowchart showing the operation of the numerical control device shown in FIG. 2.

Next, the operation of the numerical control device 10 will be described with reference to the flowchart of FIG. 7. The operation of FIG. 7 is executed in a constant cycle during the machining on a workpiece under the control of the machining control unit 62. It is also assumed that at least during the machining on the workpiece, the vibration acquisition unit 64 periodically acquires vibration occurring in the tool 22 in a cycle that is equal to or shorter than the aforementioned constant cycle, and the state acquisition unit 68 periodically acquires the state of the spindle motor M1 (rotational speed and torque) in a cycle that is equal to or shorter than the aforementioned constant cycle.

At step S1, the vibration acquisition unit 64 determines whether chatter vibration has occurred (that is, whether vibration of a predetermined amplitude or greater has occurred in the tool 22), based on the detection signal detected by the vibration sensor 20a. If it is determined at step S1 that chatter vibration has occurred, the control goes to step S2. If it is determined at step S1 that no chatter vibration occurs, this operation is terminated.

At step S2, the machining stopping unit 66 stops machining performed by the machining control unit 62.

Next, at step S3, the compensation plan calculating unit 70 calculates the multiple compensation plans, based on the state of the spindle motor M1 acquired by the state acquisition unit 68 at the time of occurrence of the chatter vibration, i.e., based on the state data indicative of the state of the spindle motor M1 under the current machining conditions. The compensation plans to be calculated include the first compensation plan (compensation plans (1) and (2)), the second compensation plan (compensation plans (3) and (4)), and the third compensation plan (compensation plans (5) and (6)). The second compensation plan is calculated using also the data concerning loss of the spindle motor M1 stored in the storage unit 54. In the case where the spindle motor M1 is an induction motor, the compensation plan calculating unit 70 calculates compensation plans (1) to (6) as shown in FIG. 3. In the case where the spindle motor M1 is a synchronous motor, the compensation plan calculating unit 70 calculates compensation plans (1) to (6) as shown in FIG. 4.

Next, at step S4, the display control unit 72 displays the state of the spindle motor M1 acquired by the state acquisition unit 68 at the time of occurrence of the chatter vibration, and the multiple compensation plans (1) to (6) calculated at step S3. Thus, a screen shown in FIG. 3 or FIG. 4 is displayed on the display unit 52.

Next, at step S5, the control unit 56 determines whether or not a compensation plan has been selected by the operator. If it is determined at step S5 that no compensation plan has been selected, the control remains at step S5 until selection is made. If it is determined that a compensation plan has been selected, the control goes to step S6.

At step S6, the machining condition changing unit 74 changes the machining conditions so as to compensate the state of the spindle motor M1 in conformity with the compensation plan selected by the operator, within the usable range 130 of the tool 22 and within the output permissible range 132 within which the spindle motor M1 can produce output. For example, when the compensation plan (1) is selected by the operator, the machining condition changing unit 74 changes the machining conditions so as to shift the state of the spindle motor M1, i.e., the position of the point 100, by a given amount along the fixed-power line 102 in a direction to decrease the rotational speed.

Next, at step S7, the display control unit 72 displays the state of the spindle motor M1 based on the machining conditions after change. That is, the displayed point 100 moves along the selected compensation plan to a position representing the state of the spindle motor M1 based on the machining conditions after change. For example, when the compensation plan (1) is selected by the operator, the display control unit 72 moves the displayed point 100 along the fixed-power line 102 by a given amount in a direction to decrease the rotational speed, as shown in FIGS. 5 and 6.

Next, at step S8, the trial machining control unit 76 controls the machine tool 12 so as to perform trial machining based on the machining conditions changed by the machining condition changing unit 74.

Then, at step S9, the vibration acquisition unit 64 determines whether or not chatter vibration occurs (i.e., vibration of a predetermined amplitude or greater occurs in the tool 22), based on the detection signal detected by the vibration sensor 20a. If it is determined at step S9 that chatter vibration occurs, the control goes to step S10. When it is determined at step S9 that no chatter vibration occurs, the control goes to step S11. Incidentally, when it is determined at step S9 that chatter vibration has occurred, the display control unit 72 may display the fact that chatter vibration has occurred.

At step S10, the control unit 56 determines whether or not a new compensation plan has been selected by the operator. If it is determined at step S10 that no compensation plan is selected, the control stays at step S10. If it is determined at step S10 that a compensation plan has been selected, the control returns to step S6. At this time, by selecting the same compensation plan as the previously selected one, the operator can change the machining conditions so as to further shift the state of the spindle motor M1 by a given amount in accordance with the previously selected compensation plan.

At step S11, the machining restarting unit 78 restarts the machining by the machining control unit 62.

[Modifications]

The above-described embodiment can also be modified as follows.

<Modification 1>

In the above embodiment, when the machining conditions are changed, a trial machining is first performed, and then the actual machining is restarted. However, when the machining conditions are changed, the actual machining may be restarted directly without performing the trial machining. That is, after the operation of step S7 in FIG. 7, steps S8 and S9 may be skipped, and the control may proceed to step S11.

<Modification 2>

In the above embodiment, actual machining is restarted with the machining conditions after change if a trial of machining (step S8) is performed without occurrence of chatter vibration (NO at step S9). However, when the operator gives an instruction for restarting of machining by operating the input unit 50 after the control proceeds to "NO" at step S9, the control may proceed to step S11. Further, even when chatter vibration occurs, machining may be restarted if the operator gives an instruction to restart machining by operating the input unit 50.

<Modification 3>

In the above embodiment, all the compensation plans (1) to (6) are calculated and displayed. However, there is no need to calculate all of the compensation plans (1) to (6), and at least two or greater of the compensation plans (1) to (6)

may be calculated and displayed. In this case, only the compensation plans of the same compensation type, for example, the first compensation plan (compensation plans (1) and (2)) may be displayed. Alternatively, it is possible to display the compensation plans of different compensation types, e.g., the compensation plans (1) and (4) only.

<Modification 4>

The above Modifications 1 to 3 may be arbitrarily combined as a variation.

[Technical Concepts Obtained from Embodiment]

Technical concepts that can be grasped from the above embodiment and Modifications 1 to 4 are described below.

<First Technical Concept>

The numerical control device (10) controls the machine tool (12) that machines a workpiece with the tool (22) attached to the spindle (20) by moving the tool (22) and the workpiece relatively to each other, in accordance with machining conditions. The numerical control device (10) includes: the machining control unit (62) configured to at least control the spindle motor (M1) of the machine tool (12) so as to perform machining in accordance with the machining conditions; the vibration acquisition unit (64) configured to acquire vibration occurring in the tool (22); the machining stopping unit (66) configured to stop the machining on the workpiece performed by the machining control unit (62) when vibration of a predetermined amplitude or greater occurs in the tool (22); the state acquisition unit (68) configured to acquire state data indicating the state of the spindle motor (M1) configured to rotate the spindle (20); the compensation plan calculating unit (70) configured to calculate, based on the state data, multiple compensation plans for compensating the state of the spindle motor (M1) in order to suppress vibration occurring in the tool (22) when vibration of the predetermined amplitude or greater occurs in the tool (22); and the display control unit (72) configured to cause the display unit (52) to display the state of the spindle motor (M1) at the time of occurrence of vibration having the predetermined amplitude or greater in the tool (22), together with the calculated multiple compensation plans, when vibration of the predetermined amplitude or greater has occurred in the tool (22).

With the above configuration, it is possible to easily assist in changing the machining conditions in order to suppress chatter vibration, taking into consideration machining efficiency, the loss of the spindle motor (M1), the amount of heat generation, and the like. Therefore, the operator can select appropriate machining conditions for suppressing chatter vibration from the multiple displayed compensation plans, in consideration of machining efficiency, the loss of the spindle motor (M1), the amount of heat generation, and the like.

The compensation plan calculating unit (70) may be configured to calculate at least two compensation plans, among six compensation plans including two compensation plans in which the output of the spindle motor (M1) is kept the same as the output of the spindle motor (M1) at the time of occurrence of vibration having the predetermined amplitude or greater in the tool (22), two compensation plans in which the loss of the spindle motor (M1) is kept the same as the loss of the spindle motor (M1) at the time of occurrence of vibration having the predetermined amplitude or greater in the tool (22), and two compensation plans in which the torque of the spindle motor (M1) is kept the same as the torque of the spindle motor (M1) at the time of occurrence of vibration having the predetermined amplitude or greater in the tool (22). With the above configuration, the operator is capable of selecting, from among the multiple displayed compensation plans, appropriate machining conditions for suppressing chatter vibration in consideration of machining efficiency, the loss of the spindle motor (M1), the amount of heat generation, and the like.

The compensation plan calculating unit (70) may be configured to calculate the two compensation plans in which the loss of the spindle motor (M1) is kept the same as the loss of the spindle motor (M1) at the time of occurrence of vibration having the predetermined amplitude or greater in the tool (22), based on the state data and data concerning loss of the spindle motor (M1). As a result, it is possible to accurately calculate the two compensation plans in which the loss of the spindle motor (M1) remains unchanged.

The state of the spindle motor (M1) may include the rotational speed of the spindle motor (M1) and the torque of the spindle motor (M1).

The numerical control device (10) may further include the machining condition changing unit (74) configured to change the machining conditions so as to shift the state of the spindle motor (M1) by a given amount from the state of the spindle motor (M1) at a time when vibration of the predetermined amplitude or greater has been detected, in accordance with the compensation plan selected by an operator, within a usable range (130) of the tool (22) and within an output permissible range (132) within which the spindle motor (M1) can produce output; and a trial machining control unit (76) configured to perform trial machining on the workpiece, based on the changed machining conditions. With the above configuration, it is possible to confirm whether or not chatter vibration occurs under the machining conditions changed according to the compensation plan selected by the operator.

The numerical control device (10) may further include the machining restarting unit (78) configured to restart machining on the workpiece by the machining control unit (62) with the machining conditions changed by the machining condition changing unit (74), in a case where no vibration of the predetermined amplitude or greater occurs in the tool (22) or in a case where an instruction is given by an operator, when the trial machining is performed by the trial machining control unit (76). With the above configuration, it is possible to restart machining with the machining conditions that do not cause chatter vibration or with the machining conditions that satisfy the operator.

The numerical control device (10) may further include: the machining condition changing unit (74) configured to change the machining conditions so as to shift the state of the spindle motor (M1) by a given amount from the state of the spindle motor (M1) at the time when vibration of the predetermined amplitude or greater has been detected, in accordance with the compensation plan selected by an operator, within the usable range (130) of the tool (22) and within the output permissible range (132) within which the spindle motor (M1) can produce output; and the machining restarting unit (78) configured to restart machining on the workpiece by the machining control unit (62), with the changed machining conditions. With the above configuration, the machining can be restarted with the machining conditions changed according to the compensation plan selected by the operator.

The display control unit (72) may be configured to, when the compensation plan is selected by the operator, shift the currently displayed state of the spindle motor (M1) by a given amount along the selected compensation plan, within the usable range (130) of the tool (22) and within the output permissible range (132) within which the spindle motor (M1) can produce output. With the configuration, it is possible to visually recognize the state of the spindle motor (M1) based on the changed machining conditions.

<Second Technical Concept>

The numerical control method controls the machine tool (12) that machines a workpiece with the tool (22) attached to the spindle (20) by moving the tool (22) and the workpiece relatively to each other, in accordance with machining conditions. The numerical control method includes: a machining control step of at least controlling the spindle motor (M1) of the machine tool (12) so as to perform machining in accordance with the machining conditions; a vibration acquisition step of acquiring vibration occurring in the tool (22); a machining stopping step of stopping the machining on the workpiece performed in the machining control step when vibration of a predetermined amplitude or greater occurs in the tool (22); a state acquisition step of acquiring state data indicating the state of the spindle motor (M1) configured to rotate the spindle (20); a compensation plan calculating step of calculating, based on the state data, multiple compensation plans for compensating the state of the spindle motor (M1) in order to suppress vibration occurring in the tool (22) when vibration of the predetermined amplitude or greater occurs in the tool (22); and a display control step of causing a display unit (52) to display the state of the spindle motor (M1) at the time of occurrence of vibration having the predetermined amplitude or greater in the tool (22), together with the calculated multiple compensation plans, when vibration of the predetermined amplitude or greater has occurred in the tool (22).

With the above configuration, it is possible to easily assist in changing the machining conditions in order to suppress chatter vibration, taking into consideration machining efficiency, the loss of the spindle motor (M1), the amount of heat generation, and the like. Therefore, the operator can select appropriate machining conditions for suppressing chatter vibration from the multiple displayed compensation plans, in consideration of machining efficiency, the loss of the spindle motor (M1), the amount of heat generation, and the like.

The compensation plan calculating step may calculate at least two compensation plans, among six compensation plans including two compensation plans in which the output of the spindle motor (M1) is kept the same as the output of the spindle motor (M1) at the time of occurrence of vibration having the predetermined amplitude or greater in the tool (22), two compensation plans in which the loss of the spindle motor (M1) is kept the same as the loss of the spindle motor (M1) at the time of occurrence of vibration having the predetermined amplitude or greater in the tool (22), and two compensation plans in which the torque of the spindle motor (M1) is kept the same as the torque of the spindle motor (M1) at the time of occurrence of vibration having the predetermined amplitude or greater in the tool (22). With the above configuration, the operator is capable of selecting, from among the multiple displayed compensation plans, appropriate machining conditions for suppressing chatter vibration in consideration of machining efficiency, the loss of the spindle motor (M1), the amount of heat generation, and the like.

The compensation plan calculating step may calculate the two compensation plans in which the loss of the spindle motor (M1) is kept the same as the loss of the spindle motor (M1) at the time of occurrence of vibration having the predetermined amplitude or greater in the tool (22), based on the state data and data concerning the loss of the spindle motor (M1). As a result, it is possible to accurately calculate the two compensation plans in which the loss of the spindle motor (M1) remains unchanged.

The state of the spindle motor (M1) may include the rotational speed of the spindle motor (M1) and the torque of the spindle motor (M1).

The numerical control method may further include: a machining condition changing step of changing the machining conditions so as to shift the state of the spindle motor (M1) by a given amount from the state of the spindle motor (M1) at the time of occurrence of vibration having the predetermined amplitude or greater in the tool (22), in accordance with the compensation plan selected by an operator, within the usable range (130) of the tool (22) and within the output permissible range (132) within which the spindle motor (M1) can produce output; and a trial machining control step of performing trial machining on the workpiece based on the changed machining conditions. With the above configuration, it is possible to confirm whether or not chatter vibration occurs under the machining conditions changed according to the compensation plan selected by the operator.

The numerical control method may further include a machining restarting step of restarting machining on the workpiece performed by the machining control step with the machining conditions changed in the machining condition changing step, in a case where no vibration of the predetermined amplitude or greater occurs in the tool (22) or in a case where an instruction is given by an operator, when the trial machining is performed in the trial machining control step. With the above configuration, it is possible to restart machining with the machining conditions that do not cause chatter vibration or with the machining conditions that satisfy the operator.

The numerical control method may further include: a machining condition changing step of changing the machining conditions so as to shift the state of the spindle motor (M1) by a given amount from the state of the spindle motor (M1) at the time of occurrence of vibration having the predetermined amplitude or greater in the tool (22), in accordance with the compensation plan selected by an operator, within the usable range (130) of the tool (22) and within the output permissible range (132) within which the spindle motor (M1) can produce output; and a machining restarting step of restarting machining on the workpiece performed in the machining control step, with the changed machining conditions. As a result, the machining can be restarted with the machining conditions changed according to the compensation plan selected by the operator.

When the compensation plan is selected by the operator, the display control step may shift the currently displayed state of the spindle motor (M1) by a given amount along the selected compensation plan, within the usable range (130) of the tool (22) and within the output permissible range (132) within which the spindle motor (M1) can produce output. With the configuration, it is possible to visually recognize the state of the spindle motor (M1) based on the changed machining conditions.

While the invention has been particularly shown and described with reference to preferred embodiments, it will be understood that variations and modifications can be effected thereto by those skilled in the art without departing from the scope of the invention as defined by the appended claims.

What is claimed is:

1. A numerical control device for controlling a machine tool configured to machine a workpiece with a tool attached to a spindle by moving the tool and the workpiece relatively to each other, in accordance with machining conditions, comprising:

a machining control unit configured to at least control a spindle motor of the machine tool so as to perform machining in accordance with the machining conditions;

a vibration acquisition unit configured to acquire vibration occurring in the tool;

a machining stopping unit configured to stop the machining on the workpiece performed by the machining control unit when vibration of a predetermined amplitude or greater occurs in the tool;

a state acquisition unit configured to acquire state data indicating a state of the spindle motor configured to rotate the spindle;

a compensation plan calculating unit configured to calculate, based on the state data, multiple compensation plans for compensating the state of the spindle motor in order to suppress vibration occurring in the tool when vibration of the predetermined amplitude or greater occurs in the tool; and a display control unit configured to cause a display unit to display the state of the spindle motor at a time of occurrence of vibration having the predetermined amplitude or greater in the tool, together with the calculated multiple compensation plans, when vibration of the predetermined amplitude or greater has occurred in the tool.

2. The numerical control device according to claim 1, wherein the compensation plan calculating unit is configured to calculate at least two compensation plans, among six compensation plans including two compensation plans in which output of the spindle motor is kept same as output of the spindle motor at the time of occurrence of vibration having the predetermined amplitude or greater in the tool, two compensation plans in which loss of the spindle motor is kept same as loss of the spindle motor at the time of occurrence of vibration having the predetermined amplitude or greater in the tool, and two compensation plans in which torque of the spindle motor is kept same as torque of the spindle motor at the time of occurrence of vibration having the predetermined amplitude or greater in the tool.

3. The numerical control device according to claim 2, wherein the compensation plan calculating unit is configured to calculate the two compensation plans in which the loss of the spindle motor is kept the same as the loss of the spindle motor at the time of occurrence of vibration having the predetermined amplitude or greater in the tool, based on the state data and data concerning loss of the spindle motor.

4. The numerical control device according to claim 1, wherein the state of the spindle motor includes a rotational speed of the spindle motor and a torque of the spindle motor.

5. The numerical control device according to claim 1, further comprising:

a machining condition changing unit configured to change the machining conditions so as to shift the state of the spindle motor by a given amount from the state of the spindle motor at a time when vibration of the predetermined amplitude or greater has been detected, in accordance with the compensation plan selected by an operator, within a usable range of the tool and within an output permissible range within which the spindle motor is permitted to produce output; and a trial machining control unit configured to perform trial machining on the workpiece, based on the changed machining conditions.

6. The numerical control device according to claim 5, further comprising a machining restarting unit configured to restart machining on the workpiece by the machining control unit with the machining conditions changed by the machining condition changing unit, in a case where no vibration of the predetermined amplitude or greater occurs in the tool or in a case where an instruction is given by the operator, when the trial machining is performed by the trial machining control unit.

7. The numerical control device according to claim 5, wherein the display control unit is configured to, when the compensation plan is selected by the operator, shift the currently displayed state of the spindle motor by a given amount along the selected compensation plan, within the usable range of the tool and within the output permissible range within which the spindle motor is permitted to produce output.

8. The numerical control device according to claim 1, further comprising:

a machining condition changing unit configured to change the machining conditions so as to shift the state of the spindle motor by a given amount from the state of the spindle motor at a time when vibration of the predetermined amplitude or greater has been detected, in accordance with the compensation plan selected by an operator, within a usable range of the tool and within an output permissible range within which the spindle motor is permitted to produce output; and a machining restarting unit configured to restart machining on the workpiece by the machining control unit, with the changed machining conditions.

9. The numerical control device according to claim 8, wherein the display control unit is configured to, when the compensation plan is selected by the operator, shift the currently displayed state of the spindle motor by a given amount along the selected compensation plan, within the usable range of the tool and within the output permissible range within which the spindle motor is permitted to produce output.

10. A numerical control method for controlling a machine tool configured to machine a workpiece with a tool attached to a spindle by moving the tool and the workpiece relatively to each other, in accordance with machining conditions, comprising:

a machining control step of at least controlling a spindle motor of the machine tool so as to perform machining in accordance with the machining conditions;

a vibration acquisition step of acquiring vibration occurring in the tool;

a machining stopping step of stopping the machining on the workpiece performed in the machining control step when vibration of a predetermined amplitude or greater occurs in the tool;

a state acquisition step of acquiring state data indicating a state of the spindle motor configured to rotate the spindle;

a compensation plan calculating step of calculating, based on the state data, multiple compensation plans for compensating the state of the spindle motor in order to suppress vibration occurring in the tool when vibration of the predetermined amplitude or greater occurs in the tool; and a display control step of causing a display unit to display the state of the spindle motor at a time of occurrence of vibration having the predetermined amplitude or greater in the tool, together with the calculated multiple compensation plans, when vibration of the predetermined amplitude or greater has occurred in the tool.

11. The numerical control method according to claim 10, the compensation plan calculating step calculates at least two compensation plans, among six compensation plans including two compensation plans in which output of the spindle motor is kept same as output of the spindle motor at the time of occurrence of vibration having the predetermined amplitude or greater in the tool, two compensation plans in which loss of the spindle motor is kept same as loss of the spindle motor at the time of occurrence of vibration having the predetermined amplitude or greater in the tool, and two compensation plans in which torque of the spindle motor is kept same as torque of the spindle motor at the time of occurrence of vibration having the predetermined amplitude or greater in the tool.

12. The numerical control method according to claim 11, wherein the compensation plan calculating step calculates the two compensation plans in which the loss of the spindle motor is kept the same as the loss of the spindle motor at the time of occurrence of vibration having the predetermined amplitude or greater in the tool, based on the state data and data concerning loss of the spindle motor.

13. The numerical control method according to claim 10, wherein the state of the spindle motor includes a rotational speed of the spindle motor and a torque of the spindle motor.

14. The numerical control method according to claim 10, further comprising:
 a machining condition changing step of changing the machining conditions so as to shift the state of the spindle motor by a given amount from the state of the spindle motor at the time of occurrence of vibration having the predetermined amplitude or greater in the tool, in accordance with the compensation plan selected by an operator, within a usable range of the tool and within an output permissible range within which the spindle motor is permitted to produce output; and
 a machining restarting step of restarting machining on the workpiece performed in the machining control step, with the changed machining conditions.

15. The numerical control method according to claim 14, further comprising a trial machining control step of performing trial machining on the workpiece, based on the changed machining conditions, wherein
 the machining restarting step restarts machining on the workpiece performed by the machining control step with the machining conditions changed in the machining condition changing step, in a case where no vibration of the predetermined amplitude or greater occurs in the tool or in a case where an instruction is given by the operator, when the trial machining is performed in the trial machining control step.

16. The numerical control method according to claim 15, wherein, when the compensation plan is selected by the operator, the display control step shifts the currently displayed state of the spindle motor by a given amount along the selected compensation plan, within the usable range of the tool and within the output permissible range within which the spindle motor is permitted to produce output.

17. The numerical control method according to claim 14, wherein, when the compensation plan is selected by the operator, the display control step shifts the currently displayed state of the spindle motor by a given amount along the selected compensation plan, within the usable range of the tool and within the output permissible range within which the spindle motor is permitted to produce output.

* * * * *